United States Patent Office 3,471,439
Patented Oct. 7, 1969

3,471,439
REINFORCING FILLER
Harris J. Bixler, and Gary J. Fallick, Lexington, Mass., assignors to Amicon Corporation, Cambridge, Mass., a corporation of Massachusetts
No Drawing. Filed Mar. 10, 1966, Ser. No. 533,238
Int. Cl. C08f 45/02; C08k 1/84
U.S. Cl. 260—41
23 Claims

ABSTRACT OF THE DISCLOSURE

A finely divided non-reinforcing filler, the particles of which are coated with an organic compound having a chemical affinity for the filler surface, with an organic compound having at least two polymerizable ethylenic unsaturations, and with a free radical generator, is prepared. This filler, with or without the free radical generator, is dispersed in a mass of thermoplastic organic material and the unsaturated material is polymerized to bond the filler to the mass of organic material thereby providing a graded-property region between matrix polymer and the filler particles while leaving the matrix free of cross-linking.

---

This invention relates to a novel filler having reinforcing properties and to organic polymeric compositions containing such fillers as well as to the method of making them.

A wide variety of particulate fillers and pigments, usually inorganic materials, have long been used in organic polymeric compositions, e.g., natural and synthetic rubber compositions as well as synthetic resin and plastic compositions. These fillers have in some cases been used simply as extenders or diluents for the matrix material. While the filler usually changes such physical properties of the matrix as density, hardness, stiffness, etc., only a very few of the many varieties of filler which have been commercially available have had sufficient effectiveness in increasing the tensile strength, modulus, or toughness of the matrix to be classified as "reinforcing" fillers; the principal reinforcing fillers are certain varieties of carbon black, e.g., channel black, and a few types of silica.

It has now been found that conventional non-reinforcing particulate fillers and pigments can be converted into fillers having reinforcing properties by treating the fillers by mixing with a material having at least one ethylenic unsaturation. The treated filler particles when dispersed in the desired matrix thermoplastic polymeric material and heated produce changes in physical properties of the matrix quite unlike the changes produced by the untreated fillers, the difference being characterized chiefly by a marked increase in toughness of the composition. It is preferred, for best results, that a free radical generator be included with the unsaturated material. It is also preferred that the unsaturated material include at least some material having two or more polymerizable ethylenic unsaturations, and that there be present an organic material which has a specific affinity for the surface of the filler particle, e.g., an acidic material or proton donor when the filler particle is alkaline in nature, and an alkaline material or proton acceptor when the filler is acidic in nature. Preferably the material having the affinity for the particle surface itself is a compound containing at least one ethylenic unsaturation, or is capable of forming a material containing such an unsaturation when heated together with a free radical generator. It is possible to use with the free radical generator a single compound which combines all of the desired attributes, i.e., it may possess affinity for a particular filler and may contain two polymerizable ethylenic unsaturations. However, it is also possible to use a mixture of two different compounds, one of which has no specific affinity for the particle surface but which contains at least one polymerizable ethylenic unsaturation, and the other of which contains no ethylenic unsaturation but does possess specific affinity for the particle surface. Preferably there is used a mixture of two compounds, one of which contains two or more ethylenic unsaturations and no specific affinity for the particle surface while the other does possess such affinity and also contains a single ethylenic unsaturation. By selecting a free radical generator having the proper activity it is possible to take advantage of the heating to which the matrix material is normally subjected during conventional processing to bring about the desired change in the filler. This feature is advantageous in that the advantages of the present invention may be achieved without making any changes in the equipment or apparatus used for extruding, molding or otherwise heat-forming the matrix material into the desired shapes.

The fillers which are useful in the present invention include any of the non-reinforcing particulate fillers. The fillers must be in the form of finely divided particles. They may be approximately isometric, having a maximum diameter, i.e., a maximum linear dimension, of ten microns, preferably five microns; or they may be in the form of plates or needles (fibers) having a maximum thickness or diameter of ten microns, preferably five microns. Compositions containing larger particles tend to be highly abrasive to processing equipment when in molten form and are undesirable for this reason. The minimum size of the filler particles is not critical, any of the conventionally used fillers being suitable in this respect. Among the specific fillers which may be used in the present invention are asbestos, ground glass, kaolin and other clay minerals, non-reinforcing silica, calcium carbonate (whiting), magnesium oxide, barium carbonate, barium sulfate (barytes), metal fibers and powders, glass fibers, refractory fibers, non-reinforcing carbon blacks, titanium dioxide, mica, talc, and inorganic coloring pigments.

The total amount of treating material may vary from 1 to 100% by weight of the filler, of which at least 0.1% preferably from 0.1 to 10% (by weight of the filler) should have a specific affinity for the surface of the filler particles, and of which at least 1%, preferably from 1 to 50%, (by weight of the filler) preferably contains two or more polymerizable ethylenic unsaturations in a single molecule.

The compound or compounds containing at least one ethylenic unsaturation need not be monomeric in nature, but may be low molecular weight polymers or oligomers, having a molecular weight up to about 5000, which contain residual unsaturation. When such a polymer is employed in the treating material, a free radical generator must also be present in the material in an amount from 0.5 to 5% by weight of the unsaturated polymer. Polymers having a molecular weight higher than about 5000 are difficult to use because of their flow properties. It is also possible to apply a monomeric ethylenically unsaturated compound to the filler particles and cause polymerization to occur in situ on the particle surface to produce a polymer containing residual unsaturation and having a molecular weight below about 5000. In this case some residual free radical generator, from 0.5 to 5% by weight of the unsaturated polymer, must be included in the mixture in order to obtain the desired results when the composition is blended with the matrix organic polymer.

Among the monomeric compounds containing two or more polymerizable ethylenic unsaturations which may be used in the present invention are the following: butylene glycol dimethacrylate, butylene glycol diacrylate, ethylene glycol dimethacrylate, ethylene glycol diacrylate, diethylene glycol diacrylate, triethylene glycol diacrylate, polyethylene glycol dimethacrylate, polyethylene glycol diacrylate, trimethylol propane trimethacrylate, trimethylol propane triacrylate, divinyl sulfone, dicyclopentadiene, bis-allyl glycol dicarbonate, triallyl cyanurate, acetyl triallyl citrate, divinyl benzene, diallyl phthalate, tetraallyl methylenediamine, tetraallyl oxyethane, 3-methyl-1,4,6-heptatriene; 1,10-decamethylene glycol dimethacrylate, and the like. Of these the mono-, di-, and triacrylates and methacrylates, the dicarbonates, and dicyclopentadiene are preferred. In addition the following low molecular weight, polyunsaturated polymers may be used: polybutadiene oligomers, hydroxyl terminated polybutadiene oligomers, hydroxyl terminated styrene-butadiene and acrylonitrile-butadiene oligomers, unsaturated polyesters, partial allylic esters of styrene-maleic anhydride oligomers and the like, of which the first two are particularly preferred. The unsaturated materials (monomers and oligomers) may in many instances comprise one or more of the following monomers containing a single ethylenic unsaturation per molecule: ethyl acrylate, butyl acrylate, butyl methacrylate, 2-ethylhexyl acrylate, lauryl methacrylate, styrene, vinyl esters of carboxylic acids, acrylic acid, methacrylic acid, maleic anhydride, 2-vinylpyridine, 4 - vinylpyridine, aminomethyl acrylate, aminomethyl methacrylate, dimethylaminoethyl methacrylate, t-butylaminoethyl methacrylate, N-vinyl pyrrolidone, methacrylamide, vinyl-tris(β-methoxyethoxy)silane, vinyl trimethoxyethoxy)silane, vinyl trimethoxysilane, vinyl trichlorosilane and the like.

The unsaturated materials which possess a strong affinity for the acidic surfaces found on filler particles such as kaolin and silica may be selected from the following: allyl isocyanate, methacrylamide, 2 - methyl - 5 - vinylpyridine, disoya - dimethyl ammonium chloride, N - vinyl pyrrolidone, vinyl cyclohexene monoxide, triallyl cyanurate, bis(2 - isocyanatoethyl) - 4 - cyclohexene - 1,2 - dicarboxylate, bis(2 - isocyanatoethyl)fumarate, 2 - vinylpyridine, 4 - vinylpyridine, dimethylaminoethyl methacrylate, t - butylaminoethyl methacrylate, vinyl - tris(β-methoxyethoxy)silane, vinyl trimethoxysilane, vinyl trichlorosilane, methacryloxypropyltrimethoxysilane and the like. Of these, the first five are particularly preferred. In addition saturated alkyl compounds which possess a strong affinity for the filler surface and which are precursors of unsaturated compounds, i.e., which contain one or more carbon atoms from which a hydrogen atom can be abstracted by a free radical, may be used in place of the ethylenically unsaturated compound having a strong affinity for the filler surface. Examples of such compounds are: ethylenediamine, tetraethylenepentamine and the like.

The unsaturated materials which possess a strong affinity for the basic or alkaline surfaces encountered on filler particles such as calcium carbonate or magnesium oxide may be selected from the following: acrylic acid, methacrylic acid, oleic acid, linoleic acid, ricinoleic acid, maleic anhydride, and the like. As in the case of the acid fillers, saturated surface active compounds can be used in place of ethylenically unsaturated surface active compounds particularly if they possess one or more carbon atoms from which a hydrogen atom can be abstracted by a free radical. Among such compounds are stearic acid, calcium stearate, and the like.

In many instances a strong affinity exists between an organic unsaturated material and the surface of a polar, mineral filler particle if the organic compound contains a moiety of high polarity without regard to the acidic or basic character of it or of the filler particle surface. N-vinyl pyrrolidone, alkyl acrylates, and alkyl methacrylates are all attracted to both acidic and basic filler surfaces because of the polarity of the pyrrolidone and ester moieties. For this reason some of the unsaturated materials listed above as having an affinity for basic fillers can be used with acidic fillers with only slightly diminished results and vice versa.

While it is possible to obtain satisfactory results simply by mixing the unsaturated compound with the filler, then dispersing the mixture in the matrix organic polymeric material and heating, undesirably long periods of heating or excessively high temperatures are usually required in this case. Preferably there is employed along with the unsaturated compound, as pointed out above, one or more free radical generators such as an organic peroxide or hydroperoxide or the like in a total amount up to 5% by weight of the unsaturated material; usually at least 0.5% by weight is needed to provide the desired effect. The peroxide used preferably has a half-life of at least 15 seconds at a temperature of 130° C., although free radical generators having half-lives as low as 1.5 seconds at 130° C., may be used; it may have a half-life as much as about 10 hours. Usually it is desirable to employ a peroxide having a half-life no greater than 30 minutes at 130° C.; when a peroxide having a longer half-life is used, it is desirable to mix with it a decomposition promoter such as cobalt or manganese organosalts, tertiary amines, or mercaptans. Among the most useful free radical generators are lauroyl peroxide, azobisisobutyronitrile, benzoyl peroxide, tertiary butyl perbenzoate, dicumyl peroxide, di(tertiary-butyl)peroxide, cumene hydroperoxide, 2,5-dimethyl-2,5-di(t-butylperoxy)hexane, 2,5-dimethyl - 2,5 - di(t-butyl-peroxy)hexyne, tertiary butyl hydroperoxide, isopropyl percarbonate, and the like.

The matrix organic polymeric material with which the filler and unsaturated material (with or without free radical generator) may be mixed includes any of the rubbers, resins, or plastics with which conventional fillers are employed. The present invention makes it possible to obtain filled compositions having not only increased stiffness as compared with the unfilled matrix material, but also avoids the decrease in toughness which normally accompanies the introduction of a non-reinforcing filler into such a matrix material. In most cases the present invention makes it possible to provide a filled composition having a greater toughness than the unfilled material. Furthermore, the present invention does not require any appreciable crosslinking of the matrix material itself so that the filled composition retains essentially the processibility of the matrix material until and unless the latter material has been deliberately crosslinked or vulcanized. Among the rubbers, resins, and plastics with which the present invention may be used are natural rubber; synthetic rubbers such as styrene-butadiene rubber; ethylene-propylene terpolymer rubber; urethane rubbers; polyalkylenes such as polyethylene, polypropylene, and polyisobutylene; poly-acrylonitrile; polybutadiene; copolymers of butadiene and acrylonitrile; polystyrene; copolymers of styrene with butadiene and acrylonitrile; copolymers of ethylene with propylene or butene-1 or vinyl acetate or maleic anhydride; polycarbonate resins; phenoxy resins; polyvinyl chloride; copolymers of vinyl chloride with vinyl acetate or other vinyl esters; polyvinyl acetate; linear polyesters; polyvinyl acetals; polyvinylidene chloride; copolymers of vinylidene chloride with vinyl chloride and acrylic acid; poly(methyl methacrylate); superpolyamides; polysulfones; allyl resins such as a polymer of diallyl phthalate; epoxy resins, phenolic resins; silicone resins; polyester resins including alkyd resins; and others.

When the matrix organic polymeric material is a rubbery polymer or an elastomer, and if it is desired to have a filled composition of maximum toughness at room temperature or above, it is preferred to employ an unsaturated material which when polymerized by itself produces a polymer having a higher modulus than the matrix material. However, when it is desired to produce a composition having maximum toughness at low temperatures, i.e., at temperatures below room temperature, e.g., −20° C., it is preferred to employ an unsaturated material which when polymerized by itself forms a polymer having a glass transition temperature well below the use temperature, i.e., below about −20° C., preferably at least 5 to 10° C. below the use temperature, and a lower modulus than that of the matrix material. When the matrix organic polymeric material is a glassy polymer at the use temperature and if it is desired to have a filled composition of maximum toughness at the use temperature it is preferred to employ an unsaturated material which when polymerized by itself produces a polymer having a glass transition temperature lower than the use temperature.

In preparing the compositions of the present invention it is essential, for best results, that the unsaturated material and peroxide (if the latter be used) be mixed first with the filler. The unsaturated material is usually a liquid at room temperature but if it is solid it is essential that it be present in finely divided particulate form having a particle size approximately the same as or smaller than that of the filler. If nonvolatile unsaturated material is used, the mixing may be carried out in any conventional equipment such as a ball mill, Waring Blendor or similar air fluidizing device at room temperature or below the reaction temperature of reactive species present. The mixture so prepared is sufficiently stable so that it may be stored or shipped to the point where it is to be used, but excessive heating of the mixture before it is incorporated with the matrix materials should be avoided in order to obtain best results.

If a volatile unsaturated material is being used, the mixing may still be carried out in any of the above equipment, but if long shelf life is desired partial reaction of the unsaturated material on the filler surface should be brought about during or immediately after mixing the unsaturated material with the filler. This can be accomplished by using a small amount, e.g., up to 1% by weight of the unsaturated compound, of a low temperature peroxide or other free radical generator which can be activated at the temperature achieved during mixing in a high speed mixing device such as a Waring Blendor. Initiation of the reaction can also be made to take place by placing the treated filler in an oven after the mixing step and heating it to a temperature sufficiently high to activate the low temperature free radical generator but below the temperature necessary to activate the high temperature free radical generator. In such instances, where reaction is initiated before the treated filler is mixed with the matrix polymer, it is necessary to add a high temperature free radical generator to the unsaturated material in addition to the low temperature free radical generator. The former is not activated during the initial mixing and/or heating of the filler and unsaturated compound and remains available to activate the residual unsaturated compound when the matrix polymer is mixed with the treated filler at high temperature.

The treated filler, prepared as described in the foregoing paragraphs, is subsequently blended with the matrix organic polymeric material which is preferably in finely divided particulate form, the individual particles preferably having a maximum diameter or linear dimension no greater than about 100 microns in order to facilitate mixing. This mixing may be carried out in the same type of apparatus as used for the first mixture. In the case of those matrix materials which may be melted or otherwise liquified, the previously prepared mixture of filler and unsaturated (including partially reacted) material may simply be stirred into the molten or liquified matrix material. It is also possible to disperse the mixture of filler and unsaturated material into the matrix material in a Banbury mixer, or extruder, or on a roll mill or in other conventional plastics mixing apparatus. Best results are obtained using a Banbury mixer or a Brabender Plasti-Corder. Other ingredients conventionally used in such compositions may also be incorporated such as plasticizers, vulcanizing agents or crosslinking agents, dyes, etc. The relative proportions of filler and of matrix material are a matter of choice and may vary over a wide range.

Usually at least 5% by weight of the mixture of filler, unsaturated material, and free radical generator, based on the total weight of the composition, is required to obtain a substantial effect, and it is rarely desirable that the amount of the filler, unsaturated material, free radical generator mixture should exceed about 70% by volume of the total composition.

The effectiveness of the invention appears most clearly in the improvement in Izod impact strength, yield elongation and yield strength of a composition made in accordance with the invention as compared to a similar composition in which the treatment of the filler has been omitted in whole or in part. Usually the Izod impact strength or the yield elongation is the most striking measure of the improvement. In addition, the finished composition has improved dimensional stability as compared with a composition containing no filler because of the relatively low thermal coefficient of expansion of the filler as compared with that of the matrix polymer; this property increases the utility of the compositions as bonding or adhesive layers, and also as materials for making molded products of diminished warpage.

The following specific examples, in which the parts are by weight, are intended to illustrate more clearly the nature of the present invention without acting as a limitation on its scope.

EXAMPLE 1

Thirty parts by weight of kaolin having an average particle size of 0.5 micron (maximum linear dimension) were stirred with a mixture of 1.5 parts of 1,3-butylene glycol dimethacrylate, 0.3 part of a quaternary ammonium chloride containing a long chain (12 to 20 carbon atoms) unsaturated aliphatic hydrocarbon group (Arquad S-2C), and 0.03 part of dicumyl peroxide. The mixture was then subjected to ball-milling for 10 hours to insure uniform distribution of the unsaturated compounds and of the free radical generator on the surface of the kaolin particles. The unsaturated quaternary ammonium chloride compound is known to exhibit a specific affinity for the surface of the kaolin particles.

The resulting thoroughly mixed blend, in the form of a dry particulate solid, was placed in a Waring Blendor along with 68.2 parts of particulate polyethylene having a nominal density of 0.960 and a melt index of 3.0 made by low pressure polymerization in the form of a linear polymer. The mixture received from the Waring Blendor was passed through an extruder which melted it to form a fiber or strand from which test specimens were injection molded. Physical properties of these specimens were determined as set forth in the following table beside the designation "Example 1." Other test specimens were prepared in the same way from the same composition except that it contained no unsaturated compounds and no free radical generator. The physical properties of these specimens were determined and are shown in the following table beside the designation "Control with filler."

|  | Tensile modulus, p.s.i. | Yield strength, p.s.i. | Yield elongation, percent | Izod impact strength, ft.-lb./inch of notch |
|---|---|---|---|---|
| Example 1 | 140,000 | 4,100 | 22 | 1.0 |
| Control (with untreated filler) | 130,000 | 3,100 | 10 | 0.4 |

EXAMPLE 2

A variety of sample compositions were prepared as described in Example 1 except that the Arquad S-2C was either omitted completely (designated "Control") or was replaced in successive samples with an equal weight of a variety of different unsaturated materials having a specific affinity for the surface of the kaolin particles. The physical properties of the control and of the various samples were determined as set forth in the following table.

| Component | Yield strength, p.s.i. | Yield elongation, percent | Izod impact strength, ft.-lb./inch of notch |
| --- | --- | --- | --- |
| Allyl isocyanate | 3,700 | 20 | 1.8 |
| bis(2-isocyanate ethyl)fumarate | 4,000 | 18 | 1.3 |
| 2-methyl-5-vinylpyridine | 3,700 | 18 | 1.8 |
| Triallyl cyanurate | 4,000 | 19 | 0.9 |
| Gamma-methacryloxypropyl-trimethoxysilane | 3,300 | 11 | 1.2 |
| Control (omitting Arquad S-2C) | 3,500 | 8 | 0.9 |

EXAMPLE 3

Several different compositions were prepared each containing 30 parts by weight of kaolin, 1.5 parts of 1,3-butylene glycol dimethacrylate, and 0.3 part of 2-methyl-5-vinylpyridine, and to each of the compositions except one (control) was added 0.03 part of a different free radical generator as listed in the following table. Each composition was then mixed with a separate batch of 68.2 parts of polyethylene as described in Example 1 and tested for impact strength (toughness) as described in that example with the following results.

Free radical generator: Izod impact strength (ft.-lb./inch)
None (control) _____ 1.2
2,5 - dimethyl - 2,5 - di-(t-butyl-peroxy)hexane (Lupersol 101) _____ 2.1
2,5 - dimethyl - 2,5 - di(t-butyl-peroxy)hexyne-3 (Lupersol 130) _____ 2.6
Cumene hydroperoxide _____ 1.2

EXAMPLE 4

The formulation in Example 3 containing Lupersol 130 as the free radical generator was also melted in the roller head of a Brabender Plasti-Corder instead of being extruded. Test specimens were injection molded from the resulting mass and tested for toughness. The Izod impact strength was determined to be 4.6 ft.-lb./inch. The same procedure with the formulation containing cumene hydroperoxide gave an Izod impact value of 2.4 ft.-lb./inch. These results indicate that the more intensive mixing of the roller head mixer versus the extruder used in Example 3 produces better results.

EXAMPLE 5

The procedure described in Example 3 was repeated except that the quantity as well as the identity of the free radical generator were varied, with the results shown in the following table.

| Free radical generator | Amount (parts) | Izod impact strength, ft.-lb./inch |
| --- | --- | --- |
| None (control) | | 1.2 |
| Lupersol 101 | 0.045 | 2.2 |
| Lupersol 130 | 0.015 | 2.0 |
| Lupersol 130 | 0.045 | 2.3 |
| Lupersol 130 and Lupersol 101 | 0.03 / 0.015 | 2.0 |
| Lupersol 130 and Azobis isobutyronitrile | 0.03 / 0.015 | 2.1 |

EXAMPLE 6

Two samples were prepared by mixing, in each case, 30 parts by weight of kaolin with 0.3 part of 2-methyl-5-vinylpyridine and with an amount of a dimethacrylate. Two different quantities of 1,3-butylene glycol dimethacrylate were used. Two percent by weight of dicumyl peroxide, based on the amount of 1,3-butylene glycol dimethacrylate, was used in each sample. Each sample was then mixed in an extruder with 68.2 parts of polyethylene powder and the impact strength was determined as described in Example 1 with the following results:

| Amount of 1,3-butylene glycol dimethacrylate (parts) | Amount of dicumyl peroxide (parts) | Izod impact strength, ft.-lb./inch |
| --- | --- | --- |
| 0.9 | 0.018 | 1.0 |
| 0.3 | 0.006 | 0.8 |

EXAMPLE 7

The procedure of Example 6 was repeated except that one part of Lupersol 130 plus 0.2 part of a solution of cobalt naphthenate containing 6% cobalt was substituted for each part of dicumyl peroxide.

Amount of 1,3-butylene glycol dimethacrylate (parts): Izod impact strength, ft.-lb./inch
0.9 _____ 1.3
0.3 _____ 0.9

Also, 1,4-butylene glycol diacrylate was substituted for the dimethacrylate.

Amount of 1,4-butylene glycol diacrylate (parts): Izod impact strength, ft.-lb./inch
0.9 _____ 1.9
0.3 _____ 1.8

EXAMPLE 8

Two samples were prepared by mixing, in each case, 30 parts of kaolin with 0.9 part of 1,4-butylene glycol diacrylate, 0.018 part Lupersol 101, 0.004 part of a solution of cobalt naphthenate containing 6% cobalt, and an amount of 2-methyl-5-vinylpyridine: in one sample, 0.3 part, in the other 0.06 part. Each sample was then mixed in the roller head of a Brabender Plasti-Corder with 68.2 parts of polyethylene powder and the Izod impact strength of the mix was determined with the following results.

2-methyl-5-vinylpyridine (parts): Izod impact strength, ft.-lb./inch
0.3 _____ 5.5
0.06 _____ 4.1

Another sample was prepared by mixing 20 parts of kaolin, 10 parts of a titania pigment, 0.9 part of 1,4-butylene glycol diacrylate, 0.018 part Lupersol 101, 0.3 part 2-methyl-5-vinylpyridine, and 0.004 part of a solution of cobalt naphthenate containing 6% cobalt. The sample was then mixed with 68.2 parts of polyethylene as described above to produce a bright white composite material having an impact strength of 4.7 ft.-lb./inch.

EXAMPLE 9

The procedure of Example 6 was repeated except that one part of Lupersol 130 was substituted for each part dicumyl peroxide, and different quantities of the dimethacrylate were used, with the following results.

Amount of 1,3-butylene glycol dimethacrylate (parts): Izod impact strength, ft.-lb./inch
1.5 _____ 2.6
3.0 _____ 1.4

A portion of the first of these compositions was molded under heat and pressure "in a picture frame" mold 5 15/16 inch square to form a square plaque. A portion of the same polyethylene resin containing no filler was also molded under the same conditions. The latter specimen exhibited severe warping after cooling while the former remained flat; in addition, the major dimensions of the latter were 5/64 and 4/64 inch less than those of the former, showing substantially greater shrinkage.

EXAMPLE 10

Various samples were prepared by mixing in each case 30 parts by weight of kaolin, 0.3 part of 2-methyl-5-vinylpyridine, and 0.03 part of Lupersol 130 with 1.5 parts of each of the unsaturated materials listed in the following table. Each sample was then mixed with 68.2 parts of polyethylene powder in an extruder and the impact strength was determined as described in Example 1 with the results set forth in the following table.

| Unsaturated material: | Izod impact strength, ft.-lb./inch |
|---|---|
| Trimethylolpropane trimethacrylate | 2.7 |
| Triallyl cyanurate | 2.6 |
| Divinyl benzene (55% difunctional) | 2.4 |
| Diallyl phthalate | 1.4 |
| Ethyl acrylate | 1.7 |
| Butylene glycol diacrylate | 2.3 |
| Trimethylol propane triacrylate | 1.7 |
| Tetraallyl oxyethane | 1.5 |
| Tetraallyl methylenediamine | 1.3 |
| Hydroxyl terminated polybutadiene (Sinclair Poly B–DR15) | 1.7 |
| Hydroxyl terminated polybutadiene (Sinclair Poly B–DR45) | 2.1 |
| Polyester resin with 34% styrene (Koplac 3010–7) | 2.3 |

EXAMPLE 11

Compositions were prepared as described in Example 10 containing mixtures of various unsaturated materials in equal proportions by weight (0.75 part each) in place of the individual materials employed in Example 10. The compositions were tested as described in Example 10 with the following results.

| Unsaturated mixtures: | Izod impact strength, ft.-lb./inch |
|---|---|
| Butylene glycol dimethacrylate (BGD) and trimethylol propane trimethacrylate (TPT) | 2.3 |
| TPT and triallyl cyanurate (TC) | 2.3 |
| BGD and divinyl benzene (55% active) | 2.3 |
| BGD and TC | 3.2 |
| TC and divinyl benzene (55% active) | 2.8 |
| TPT and 2-ethylhexylacrylate | 2.6 |
| Butylene glycol diacrylate and divinyl benzene (55% active) | 2.8 |
| TC and trimethylol propane triacrylate | 3.1 |
| BGD and butylene glycol diacrylate | 2.5 |

EXAMPLE 12

Two samples were prepared by mixing, in each case, 30 parts of kaloin with 0.03 part of Lupersol 130 and with 1.8 parts of one of the unsaturated materials listed in the following table. The compositions were tested as described in Example 10 with the following results.

| Unsaturated material: | Izod impact strength, ft.-lb./inch |
|---|---|
| Triallyl cyanurate | 1.8 |
| Allyl isocyanate | 1.3 |

EXAMPLE 13

Compositions were prepared by mixing together, in each case, 50 parts by weight of kaolin, 0.5 part of 2-methyl-5-vinylpyridine, 0.05 part of Lupersol 130, and 2.5 parts of an unsaturated compound or mixture of unsaturated compounds as given in the following table. The mixture was further blended in a ball-mill as described in Example 1, then mixed in a Waring Blendor with 47 parts by weight of finely divided polyethylene as described in Example 1. A control mix was prepared by omitting all of the unsaturated materials and the free radical generator. The compositions were tested as described in Example 1 with the following results.

| Unsaturated material: | Izod impact strength, ft.-lb./inch |
|---|---|
| 1,3-butylene glycol dimethyacrylate | 1.5 |
| 1,3-butylene glycol dimethacrylate and equal weight of triallyl cyanurate | 2.6 |
| 1,4-butylene glycol diacrylate and equal weight of divinyl benzene (55% active) | 1.9 |
| Control (50 parts untreated filler; 50 parts polyethylene) | 0.2 |

EXAMPLE 14

Compositions were prepared by mixing together, in each case, 50 parts by weight of kaolin, 0.5 part of 2-methyl-5-vinylpyridine, 0.05 part of Lupersol 101, 0.006 part of a solution of cobalt naphthenate containing 6% cobalt, and 2.5 parts unsaturated material or mixture of unsaturated materials, as given in the following table. In samples (b) and (d) the unsaturated materials were thinned with an equal weight of xylene before mixing with the filler. The mixtures were each blended in a ball mill as described in Example 1, then mixed in each case in a Waring Blendor with 47 parts by weight of finely divided polyethylene as described in Example 1. They were then melted in the roller head of a Brabender Plasti-Corder, which was operated open to the atmosphere to allow any xylene thinner to escape. The Izod impact strengths of the resulting materials were determined as given in the following table.

| Unsaturated material: | Izod impact strength, ft.-lb./inch |
|---|---|
| (a) 1,4-butylene glycol diacrylate | 2.8 |
| (b) Polybutadiene liquid resin, M.W. approximately 2,500 (Buton 150, Enjay Chemical Co.) | 2.8 |
| (c) 1,4-butylene glycol diacrylate and equal weight of Buton 150 | 4.4 |
| (d) Hydroxy terminated butadiene-styrene copolymer liquid resin, avg. M.W.=2100 (Sinclair Petrochemicals Inc. Poly B–D CS–15) | 4.1 |

EXAMPLE 15

Compositions were prepared by mixing together, in each case, 40 parts kaolin, 1.2 parts triallyl cyanurate, 0.2 part 2-methyl-5-vinylpyridine, and 0.024 part of one of the free radical generators in the following table. The mixtures were each blended in a Henschel type mixer with 58.6 parts finely divided polyethylene as described in Example 1. After further mixing and fusing in a Banbury intensive mixer, toughness tests were performed with the following results.

| Free radical generator: | Izod impact strength, ft.-lb./inch. |
|---|---|
| Azobisisobutyronitrile | 2.0 |
| Benzoyl peroxide | 1.8 |

Also, diethylene glycol diacrylate was substituted for the triallyl cyanurate and the same procedure was followed employing the following free radical generators, with the results shown.

| Free radical generator: | Izod impact strength, ft.-lb./inch |
|---|---|
| Lauroyl peroxide | 4.3 |
| Benzoyl peroxide | 3.2 |
| Isopropyl percarbonate | 1.9 |

EXAMPLE 16

Compositions were prepared by mixing together, in each case, 40 parts of kaolin, 1.2 parts of diethylene glycol diacrylate, 0.2 part of 2-methyl-5-vinylpyridine, and 0.024 part of one of the free radical generators of the following table. The treated filler compositions so prepared were then in each case blended in a Henschel type mixer with 58.6 parts of finely divided polyethylene having a nominal density of 0.960 g./cc. and a melt index of 9.0. A "control" blend was prepared containing 40 parts of untreated kaolin and 60 parts of the same polyethylene. The blends were further mixed and fused in a Banbury mixer, and the impact strength of each was determined with the following results.

Free Radical generator:

| | Izod impact strength, ft.-lb./inch |
|---|---|
| Lauroyl peroxide | 2.3 |
| Benzoyl peroxide | 2.0 |
| Isopropyl percarbonate | 1.9 |
| Control | 0.3 |

EXAMPLE 17

A composition was prepared by mixing together 40 parts kaolin, 1.2 parts 1,4-buytlene glycol diacrylate, 0.4 part 2-methyl-5-vinylpyridine, 0.012 part benzoyl peroxide and 0.012 part Lupersol 130. After further mixing in a Waring Blendor the blend was placed in an oven for twelve hours at 65° C., a temperature high enough to activate the benzoyl peroxide but not the Lupersol 130. The odor of the unsaturated material has substantially disappeared at this point. Then it was mixed in a Waring Blendor with 58.4 parts of finely divided polyethylene powder as given in Example 1 and the composition was melted in the roller head of a Brabender Plasti-Corder. A specimen tested for toughness was found to have an Izod impact strength of 3.4 ft.-lb./inch. When the same procedure was repeated except that the Lupersol 130 was omitted, the Izod impact strength was reduced to 2.3 ft.-lb./inch.

EXAMPLE 18

A composition was prepared by mixing together 30 parts by weight of precipitated calcium carbonate having a particle size of 0.2 micron, 1.5 parts of 1,3-butylene glycol dimethacrylate, 0.3 part of methacrylic acid, and 0.036 part of Lupersol 130. The mixture was further blended in a ball mill as described in Example 1, then mixed in a Waring Blendor with 68.2 parts by weight of finely divided polyethylene as described in Example 1. The composition was melted in the roller head of a Brabender Plasti-Corder. A specimen tested for toughness was found to have an Izod impact strength of 2.2 ft.-lb./inch. A control containing only the calcium carbonate and polyethylene had an Izod impact strength of 0.5 ft.-lb./inch.

EXAMPLE 19

A composition was prepared as described in Example 18 except that finley-divided silica having a particle size of 5 microns was substituted for the calcium carbonate, and 2-methyl-5-vinylpyridine was substituted for the methacrylic acid. The resulting composition after fusing had an impact strength of 2.8 ft.-lb./inch. A control containing only the silica and polyethylene had an Izod impact strength of 1.0 ft.-lb./inch.

EXAMPLE 20

A composition was prepared as described in Example 19 except that methacryloxypropyltrimethoxysilane was substituted for the 2-methyl-5-vinylpyridine. After fusion the composition had an impact strength of 2.7 ft.-lb./inch.

EXAMPLE 21

A composition was prepared as described in Example 19 except that a high purity colloidal asbestos, consisting of rods about 200 Å. in diameter and up to several microns in length, was substituted for the silica. The resulting composition after fusing had an impact strength of 2.7 ft.-lb./inch. A control containing only asbestos and polyethylene had an Izod impact strength of 0.7 ft.-lb./inch.

EXAMPLE 22

A composition was prepared by mixing together 30 parts by weight of kaolin, 1.5 parts of 1,3-butylene glycol diacrylate, 0.3 part of 2-methyl-5-vinylpyridine, 0.03 part of Lupersol 101, and 0.006 part of a cobalt naphthenate solution containing 6% cobalt. The mixture was then subjected to ball-milling as described in Example 1. Then it was mixed in a Waring Blendor with 68.2 parts of a finely divided polypropylene having a nominal density of 0.906 g./cc. and a melt index of 10–12 g./10 minutes. The composition was melted in the roller head of a Brabender Plasti-Corder and tested for toughness. An Izod impact strength of 0.60 ft.-lb./inch was obtained. In contrast a control specimen prepared in the same way except that it contained no unsaturated compounds, and no free radical generator or cobalt solution exhibited an impact strength of 0.45 ft.-lb./inch.

EXAMPLE 23

A composition was prepared by mixing together 5 parts of kaolin, 5 parts of a hydroxy terminated styrene-butadiene copolymer containing 25 weight percent styrene having an average molecular weight of 2100, 0.05 part 2-methyl-5-vinylpyridine and 0.10 part Lupersol 130. To facilitate mixing the blend it was thinned with 5 parts of xylene to yield a smooth, readily flowing mixture. To this was added 90 parts of a finely divided polystyrene which, with stirring, converted the mixture to an irregular crumb. This composition was melted in the roller head of a Brabender Plasti-Corder opened to the atmosphere to allow the xylene to escape. The resulting mass was injection molded into test specimens for measurement of tensile properties and toughness. A control was also prepared consisting only of 5 parts kaolin and 95 parts polystyrene. The values determined are given in the following table beside the respective designations of "Example 23" and "Control with filler."

| | Tensile modulus (p.s.i.) | Tensile strength (p.s.i.) | Tensile elongation, percent | Izod impact strength, ft.-lb./inch of notch |
|---|---|---|---|---|
| Example 23 | 317,000 | 5,400 | 4 | 0.40 |
| Control with filler | 230,000 | 5,500 | 3 | 0.25 |

EXAMPLE 24

A composition was prepared by mixing together in a Waring Blendor 50 parts kaolin, 1.5 parts diethylene glycol diacrylate, 0.5 part 2-methyl-5-vinylpyridine, 0.015 part benzoyl peroxide and 0.015 part Lupersol 130. This was added to a Brabender melt of 50 parts of a branched polyethylene having a density of 0.916 gm./cc. After mixing until the composition appeared homogeneous the resulting mass was injection molded into test specimens for measurement of toughness. A control was also prepared consisting only of 50 parts kaolin and 50 parts of the same branched polyethylene. The values determined are given in the following table beside the respective designations of "Example 24" and "Control with filler."

| | Izod impact strength, ft.–lb./inch of notch |
|---|---|
| Example 24 | 7.0 |
| Control with filler | 2.6 |

While the reason for the increased toughness of compositions of the present invention is not fully understood and it is not desired to limit the invention by the following theory, it is believed that there are three elements involved. In the first place the material having specific affinity for the filler surface provides for a strong adhesive bond between filler and organic polymer. Secondly the unsaturated material provides after heating, particularly in the presence of a free radical generator, a layer of material surrounding each filler particle, and firmly bonded to it through copolymerization or grafting to the material with specific surface affinity, which provides a deformation buffering zone or graded property region between the matrix polymer and the filler particles. If the matrix polymer is a relatively low modulus, extensible rubbery polymer (e.g., natural and synthetic rubbers and polyethylene) the buffering zone polymer should be intermediate in modulus and extensibility between the filler and the matrix so that reasonably large strains in the composite do not lead to detachment of the filler from the matrix. If on the other hand the matrix polymer is a stiff, brittle polymer (e.g., polystyrene and polymethyl methacrylate) the buffering zone should have a modulus less than, and extensibility greater than, that of the matrix polymer so that microcracks which form in the matrix under stress will not propagate to the filler particle surface. Finally, the polymer in the buffering zone or graded-property region is covalently bonded by copolymerization or grafting to the matrix polymer.

Although specific embodiments of the invention have been described herein, it is not intended to limit the invention solely thereto but to include all of the obvious variations and modifications within the spirit and scope of the appended claims.

What is claimed is:

1. A finely divided composition comprising a non-reinforcing filler coated with from 1 to 100%, based on the weight of said filler, of an organic treating material which treating material contains (a) from 0.1% to 10% by weight of an organic compound having a chemical affinity for the surface of said filler, said organic compound being selected from ethylenically unsaturated compounds or compounds which contain one or more carbon atoms from which a hydrogen atom can be abstracted by a free radical, (b) from 1% to 50% by weight of said filler, of an organic compound having at least two polymerizable ethylenic unsaturations; and (c) from 0.5 to 5% by weight based on the weight of said organic compound, of a free radical generator.

2. A finely divided composition as claimed in claim 1 wherein the free radical generator has a half life of at least 15 seconds at 130° C.

3. A finely divided composition as claimed in claim 1 in which said filler has an acidic surface and said compound having said chemical affinity is a proton acceptor and said free radical generator is an organic peroxide.

4. A finely divided composition as claimed in claim 1 in which said compound having at least two ethylenic unsaturations is a polymer having a molecular weight up to about 5000 and said free radical generator is present in an amount from 0.5 to 5% by weight of the total unsaturated compounds.

5. A finely divided composition as claimed in claim 3 in which said proton acceptor is an alkaline material.

6. A finely divided composition as claimed in claim 1 in which said filler has an alkaline surface and said compound having said chemical affinity is an acidic compound.

7. The method which comprises preparing a composition as claimed in claim 1, dispersing said composition in a mass of thermoplastic organic polymeric material and heating said mass containing said dispersed composition to cause free radicals to be generated.

8. The method as claimed in claim 7 in which said polymeric material is provided in finely divided form, said composition is mixed with said finely divided polymeric material to form a finely divided mixture, and said mixture is consolidated during said heating step.

9. The method as claimed in claim 7 in which the organic polymeric material is a thermoplastic polymer of at least one ethylenically unsaturated monomer.

10. The method as claimed in claim 7 in which the organic polymeric material is polyethylene.

11. The method as claimed in claim 8 in which the organic polymeric material is a thermoplastic polymer of at least one ethylenically unsaturated monomer.

12. The method as claimed in claim 8 in which the organic polymeric material is polyethylene.

13. The method which comprises preparing a composition as claimed in claim 1 including a mixture of free radical generators at least one of which is activatable at a lower temperature than another, and heating the composition to activate only said lower-temperature-activatable generator.

14. The method as claimed in claim 13 including the additional steps of subsequently dispersing said composition in a mass of organic polymeric material and heating said mass containing said dispersed composition to cause free radicals to be generated.

15. The method as claimed in claim 14 in which said polymeric material is thermoplastic and is provided in finely divided form, said composition is mixed with said finely divided polymeric material to form a finely divided mixture, and said mixture is heated to consolidate said mixture into a mass and to cause free radicals to be generated.

16. The method as claimed in claim 14 in which the organic polymeric material is a thermoplastic polymer of at least one ethylenically unsaturated monomer.

17. The method as claimed in claim 14 in which the organic polymeric material is polyethylene.

18. The method as claimed in claim 15 in which the organic polymeric material is a thermoplastic polymer of at least one ethylenically unsaturated monomer.

19. The method as claimed in claim 15 in which the organic polymeric material is polyethylene.

20. The method for reinforcing a mass of thermoplastic organic polymer material by:
    (1) preparing a finely divided non-reinforcing filler composition coated with from 1 to 100% by weight of an organic treating material, said organic treating material containing 0.1% to 10% by weight of an organic compound having a chemical affinity for the surface of said filler, said compound being an ethylenically unsaturated compound or a compound which contains one or more carbon atoms from which a hydrogen atom can be abstracted by a free radical and from 1% to 50% by weight of said filler or organic compound having at least one polymerizable ethylenic unsaturation, and
    (2) dispersing a quantity of said filler composition in a mass of thermoplastic organic-polymer material so that said composition comprises from 5 weight percent to 70 volume percent of the resulting mixture, and
    (3) promoting, by use of a free-radical generator, the polymerization of said ethylenically unsaturated compounds to achieve a good bond of said coated filler thereto, while maintaining said mass of organic-polymer material substantially free of cross-linking.

21. The method as claimed in claim 20 in which the organic polymeric material is a thermoplastic polymer of at least one ethylenically unsaturated monomer.

22. The method as claimed in claim 20 in which the organic polymeric material is polyethylene.

23. A composition prepared by the method of claim 20.

References Cited

UNITED STATES PATENTS

| | | | |
|---|---|---|---|
| 2,780,612 | 2/1957 | Te Grotenhuis | 260—41 |
| 3,032,431 | 5/1962 | Ferrigno | 106—308 |
| 3,156,576 | 11/1964 | Te Grotenhuis | 106—308 |
| 3,190,850 | 6/1965 | Burke | 260—38 |
| 3,227,675 | 1/1966 | Papalos | 260—41 |
| 3,228,905 | 1/1966 | Talalay et al. | 260—29.7 |
| 3,271,355 | 9/1966 | Vanderbilt et al. | 260—41.5 |
| 3,304,197 | 2/1967 | Pundsack et al. | 117—126 |

MORRIS LIEBMAN, Primary Examiner

H. H. FLETCHER, Assistant Examiner

U.S. Cl. X.R.

106—308; 260—37, 38, 40, 41.5